(No Model.) 7 Sheets—Sheet 2.

A. AUGUSTE.
MACHINE FOR SAWING STONE.

No. 398,113. Patented Feb. 19, 1889.

FIG. 2.

Witnesses:
Aby. Darkoff
John Revell

Inventor:
Armand Auguste
by his Attorneys
Howson and Howson (No Model.) 7 Sheets—Sheet 3.

A. AUGUSTE.
MACHINE FOR SAWING STONE.

No. 398,113. Patented Feb. 19, 1889.

FIG. 3.

Witnesses:
Alex. Barkoff
John Revell

Inventor:
Armand Auguste
by his Attorneys
Howson and Howson (No Model.) 7 Sheets—Sheet 4.

A. AUGUSTE.
MACHINE FOR SAWING STONE.

No. 398,113. Patented Feb. 19, 1889.

FIG.4.

Witnesses:
Thx. Darkoff
John Revell

Inventor:
Armand Auguste
by his Attorneys
Howson and Howson (No Model.) 7 Sheets—Sheet 5.

A. AUGUSTE.
MACHINE FOR SAWING STONE.

No. 398,113. Patented Feb. 19, 1889.

Witnesses:
Aby. Barkoff
John Revell

Inventor:
Armand Auguste
by his Attorneys
Howson and Howson (No Model.) 7 Sheets—Sheet 7.

A. AUGUSTE.
MACHINE FOR SAWING STONE.

No. 398,113. Patented Feb. 19, 1889.

Witnesses:
Aly Barkoff
John Revell

Inventor:
Armand Auguste,
by his Attorneys
Howson and Howson

UNITED STATES PATENT OFFICE.

ARMAND AUGUSTE, OF PARIS, FRANCE.

MACHINE FOR SAWING STONE.

SPECIFICATION forming part of Letters Patent No. 398,113, dated February 19, 1889.

Application filed February 23, 1888. Serial No. 264,917. (No model.) Patented in France March 20, 1886, No. 174,898; in Belgium March 29, 1886, No. 72,543; in England May 6, 1887, No. 6,804, and in Italy May 13, 1887, No. 21,672.

*To all whom it may concern:*

Be it known that I, ARMAND AUGUSTE, industriel, of Plain Saint Denis, (Seine,) in the Republic of France, have invented Improvements in Machines for Sawing or Cutting Stone, (for which I have obtained Letters Patent in France March 20, 1886, No. 174,898; in Belgium March 29, 1886, No. 72,543; in Great Britain May 6, 1887, No. 6,804, and in Italy May 13, 1887, No. 21,672,) of which the following is a specification.

This invention relates to machines for sawing or cutting stone; and it consists, chiefly, in certain improvements in various parts of the machine, as specified below.

First. The arrangement, form, and general construction of the frame-work of sawing-machines whereby all special independent structures for carrying the intermediate mechanism transmitting the power from the motor may be dispensed with. The frame-work of the machine is composed (one) of a horizontal frame resting on four vertical columns or pillars, which are bolted at their bases to a cast-iron plate forming the bed or foundation of the entire apparatus. This horizontal frame supports all the transmitting-gear driving the endless cutting blade or band employed in these machines and regulating its action, and (two) of a superstructure of iron fastened to the said horizontal frame and situated directly above it, consisting of platforms, galleries, iron ladders, and the like. This superstructure is specially provided for carrying all the sand or grit boxes and water-tanks, which are used in cutting extremely hard materials.

Second. Means for providing a ready and exact adjustment of the endless cutting-bands, as required in sawing particular blocks of stone and for the exchange of one band for another, according to the requirements of the work to be done.

Third. Means for regulating the speed with which the cutting-blade ascends and descends. The rate of descent should be made to correspond with the degree of hardness of the material under operation and the rate of ascent will be much greater, usually about double the rate of descent. These different speeds are obtained by the action of variable-speed gear arranged on the frame of the machine.

Fourth. Means for guiding the cutting-blade, for keeping it under a constant tension, and for preventing deflection of the blade when at work. These ends I attain by the use of special guides of novel construction, which may be adjusted to correspond with the size or nature of the block of stone under operation, and, secondly, by means of a movable bearing for one of the drums carrying the band and an adjusting-screw therefor. By adjusting the distance between the supporting-drums I am enabled to use the same cutting-band, even after it has become shortened by repeated breakages and soldered joints.

Fifth. Improvements in the horizontal drums or pulleys on which the endless cutting-blade is carried, and which are made of such diameter and other dimensions as to obviate straining and breaking the blades. These drums are covered on their periphery by thick rubber cushions or pads to prevent the band from slipping, and are provided at their lower edges with flanges made in sections and attached by screws, so as to be readily removed or put on, as circumstances may demand.

Sixth. The construction of a circular basin or cup in which the end of the vertical shaft carrying the driving pulley or drum actuating the cutting-blade is supported and rotates. This cup is provided with a system of supply-pipes and discharge-tubes, through which soap and water or other suitable lubricant may be supplied to the journal, and also discharged therefrom on the bed-plate or frame of the machine. The water is afterward returned to the cistern, and can be used over again for the same purpose for a considerable period, whereby a considerable saving is effected in the lubrication of the apparatus.

Seventh. The employment of two powerful central screws arranged horizontally, slightly higher than the level of the surface of the foundation-plate of the machine, and consequently a trifle elevated above the level of the ground and situated near the center line of a track or line of rails which traverses the said plate. These two screws, being carried on supports fixed to the foundation-plates, are each provided with a sleeve having a nut or screwed socket which is capable of working along the entire length of the screws. Each of these sleeves can receive two movable catches or couplings carried by plates fixed to the frame of the trucks or trolleys, which are used for bringing up the blocks to be operated upon. The screws are turned by means of small crank-handles or hand-wheels. The object of these screws and of the sleeves to which the trucks are connected is to regulate with mechanical precision the position of the stone, and hence the action of the cutting-blade when cutting slabs which are to be of exactly the same thickness throughout, and consequently to preserve perfect parallelism between each cut, irrespective of the dimensions of the slabs.

Eighth. The construction of the trucks or trolleys carrying the blocks of stone, marble, or granite, which are operated upon by the endless band-saw or cutting-blade. These trucks or trolleys are mounted on wheels similar to railway-car wheels, and are composed of a frame of cast-iron or wood, supporting a cast-iron plate or table which is capable of turning in any direction around a central pivot upon friction-rollers. This plate is used when making vertical or oblique saw-cuts, and it is provided on its upper surface with strong cast-iron rollers, which facilitate the work of loading or unloading the materials, and consequently diminish extremely the labor of handling heavy blocks. Upon plates bolted to the front and back of the frames there are provided strong hooks or couplings, which are caused to engage with the sleeves on the central screws, hereinbefore described, in order to hold fast the trucks or trolleys during the cutting, and to adjust the spaces between the ends, as may be necessary.

Ninth. The construction of devices for controlling, distributing, and dividing the sand and water employed in cutting the harder kinds of stone, marble, and granite. These novel devices, which are placed upon a superstructure carried by the main frame of the machine, enable the proportions of sand and water in the mixture to be regulated according to the nature and degree of hardness of the materials operated upon.

Tenth. The construction of two drums or pulleys fitted upon the vertical columns or supports of the machine, which may be used instead of sliding carriages and rollers carrying a single endless band. These two drums by their special construction and arrangement admit of the employment of a large number of cutting-bands operating simultaneously for cutting stone slabs or the like of any desired thickness. The employment of these drums involves no change in the general arrangement of the apparatus, which works in the same way, and they present the immense advantage of enabling a large number of cutting-bands to be worked at once, the number so employed depending on the cuts marked out on the blocks of stone, marble, or granite to be operated upon. Consequently by means of this arrangement it is possible to employ one, two, five, or ten or more cutting blades or bands, according to the number of cuts to be made. The bands or cutting-blades working on these drums act simultaneously in a horizontal position, with their lower edges always at the same level. The distance between them is maintained absolutely parallel, and their speed of rotation is the same according as they are used. One series can consequently be exchanged for another, according to the quality of the blocks to be cut. These series form the following four distinct groups: One, toothed blades; two, blades without teeth having the lower edge straight or smooth; three, blades with notches at intervals; four, blades with diamond-pointed teeth.

The adjustment of the cuts in cutting slabs with the use of a number of blades is effected in the manner hereinbefore described.

In order that my said invention may be fully understood, I shall now proceed more particularly to describe the same, and for that purpose shall refer to the several figures on the annexed sheets of drawings, the same letters of reference indicating corresponding parts in all the figures.

This stone-cutting machine is provided with a large endless horizontally-cutting band or blade, A, Figs. 1, 2, 3, and 4, which may be made with or without teeth at its lower edge, or may be provided with notches at intervals for carrying the sand and water, or may be provided with diamonds. This band is passed round two horizontal drums, B B', provided at their lower edges with rings or flanges $a$, Fig. 1, made in sections, which are attached thereto by screws, and are easily put in place or removed, according as a toothed blade or a blade with a plain or a notched edge is employed. The throat or bottom of the groove is lined with a thick and strong rubber, $b$, to prevent slipping of the band.

The drum B' is the motive or driving drum, which imparts motion to the cutting-band A, and the drum B is loose on its shaft and serves more particularly for regulating the tension of the said cutting-band by means of a sliding head, C, capable of adjustment in a horizontal plane by means of a screw, $c$, provided with a hand-wheel.

The two drums B' and B are supported vertically by two movable supports, D D', (shown in section in Fig. 1 and in plan in Figs. 2 and 3,) provided at each end with a brass nut, $k$, and collars which slide vertically upon four hollow columns or pillars, E, on which the entire sawing apparatus is supported. The supports D D' work up and down upon the pillars E, their motion being graduated according to the speeds to be obtained and made to correspond with the different degrees of hardness of the blocks which are presented to the cutting-blade. Motion is imparted to these supports for the purpose of raising or lowering them by means of vertical screws K, situated inside the pillars E and working the nuts $k$ on the ends of the supports D D'. The support D' carries the driving-drum B', which is fixed on the lower extremity of a longitudinally-grooved vertical shaft, F. A collar or shoulder, $f$, on this shaft is supported and rolls in a brass cup, G, Fig. 1, receiving a continuous supply of soap and water, when the saw is at work, from a pipe, $g$, communicating with the bottom of a cistern, H, carried on the sliding support D'. Other pipes, $h'$ and $h$, serve for the discharge of the liquid which has been used for the lubrication of the shaft and conduct it to a receptacle arranged upon the foundation-plate below the shaft.

The upper part of the grooved shaft F passes through a hollow shaft, I, provided with internal feathers or tongues engaging with the groove in the shaft F. It is consequently free to slide vertically in the shaft I, but is compelled to rotate with it. Fixed on the upper extremity of the shaft I is a bevel-wheel, J, driven by a corresponding wheel, $j'$, on a horizontal shaft, $l$, provided with a driving-pulley, L', and a corresponding loose pulley, L, Figs. 3 and 4. The pulley L' is driven by a belt, $l'$, Fig. 4, which passes over a drum, M, carried by a driving-shaft, $m$, receiving motion directly from the engine or motor through a pulley, Z, arranged, together with a corresponding loose pulley, $z$, at the outer extremity, $x$, of the said driving-shaft. This driving-shaft, in addition to transmitting horizontal motion to the cutting-band, also produces its vertical motion by means of pulleys N and $n$, Figs. 1, 2, and 4, situated at about the center of the shaft and carrying belts O and O', working on fast and loose pulleys $o$ and $o'$ on a shaft, $p$, also carrying differential pulleys P P', which transmit motion by a belt to two corresponding differential pulleys on a shaft, R, carrying a cone or variable-speed pulley, $r$, transmitting motion by a belt to a corresponding pulley, $s$, on a shaft, T, provided with two endless screws or worms $t\ t'$, which produce the ascending or descending motion of the cutting-band A by transmitting rotary motion to toothed wheels U U, Figs. 1 and 4, situated at or near the centers of a pair of shafts, V V', provided at their extremities with bevel-wheels $u$, driving corresponding wheels $u'$, fixed on the upper ends of the screws K, placed inside the supporting-pillars E, on which the supports D D', carrying the drums, slide, as hereinbefore described.

In order to prevent the band-saw or cutting-blade A from deviating from its proper path in its passage through large or small blocks, an improved system of guides is provided on the supports D of the drums and moves with the latter. These guides are movable and provided with slides, so that they can be lengthened or shortened according to the length of the blocks of building-stone, marble, or granite placed under the saw, which they serve to support and guide with absolute rigidity in a vertical position during the cutting. They also serve to facilitate the placing of the endless band in position and to afford security against accidents resulting from the breakage or neglect to properly adjust the tension of the band. These guides are chiefly composed of four supports or sheaths, $1^a$, arranged parallel with the blade which they control, and forming part of the supports of the drums. Each of these sheaths $1^a$ receives a long and stout square bar, $1^b$, provided with rack-teeth $1^c$ on its under side gearing with a pinion, $1^e$, on a shaft, $1^d$, operated by a hand-wheel, $1^f$. The square bars sliding in the aforesaid sheaths are connected together in pairs by transverse bars $1^2$ and $1^{2'}$. Their extremities, directed toward the center of the machine, are each provided with one of the improved guiding apparatus $1^n$, so that each guiding apparatus is situated directly over the endless cutting-blade, which passes through it. There are four of these guides, each of which contains two cast-iron or wood pulleys, $1^i$, rotating on vertical axes adjusted as required by screws $1^j$. These rollers maintain the blade rigid and vertical during its horizontal motion. Underneath the saw other rollers, $1^k$, Fig. 1, on horizontal axes perpendicular to the direction of motion of the blade and supported by the guide apparatus $1^n$, serve to hold up the band and prevent it from dropping or sagging.

The supporting columns or pillars E, hereinbefore referred to, stand at the four angles of a cast-iron bed-plate, X, fixed on a solid foundation of stone and masonry. This bed-plate is crossed by a track or railway, X', Fig. 1, proceeding in a direction at right angles to the motion of the saw between the drums and on which travel trucks or trolleys Y, carrying the blocks of building-stone, marble, or granite which are to be operated on in the machine. These trolleys Y (illustrated in Fig. 1) are constructed to support the largest blocks that can be cut by the machine. They are composed of a strong frame, Y', of cast-iron or wood, mounted on four flanged wheels, $Y^2$. On the upper part of the frame Y' there is placed a cast-iron plate, $Y^g$, movable about a central pivot on rollers $Y^z$ and capable of adjustment in all directions, so as to present the blocks obliquely or perpendicularly to or parallel with the cutting-blade A. Moreover, the plate $Y^g$ is provided with rollers $Y^f$, carried on small supports or brackets and serving to facilitate the loading and unloading of the materials to be cut.

As hereinbefore explained, the cast-iron bed-plate X is crossed in the direction of its width and at right angles to the direction of motion of the blade A by a track or railway, X', which may be in direct communication with a depot of stones and marbles on the one hand and with a wharf for delivering the cut blocks on the other hand.

Figure 4:
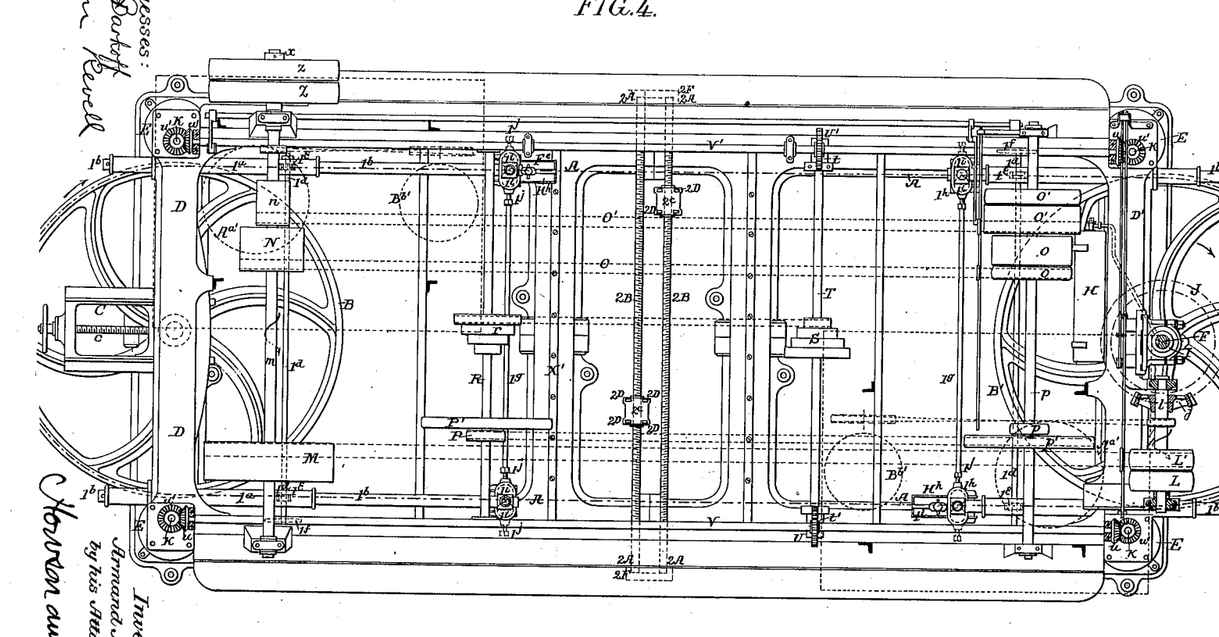
Fig. 4 shows the machine in plan.
Figures 5, 10, 11:
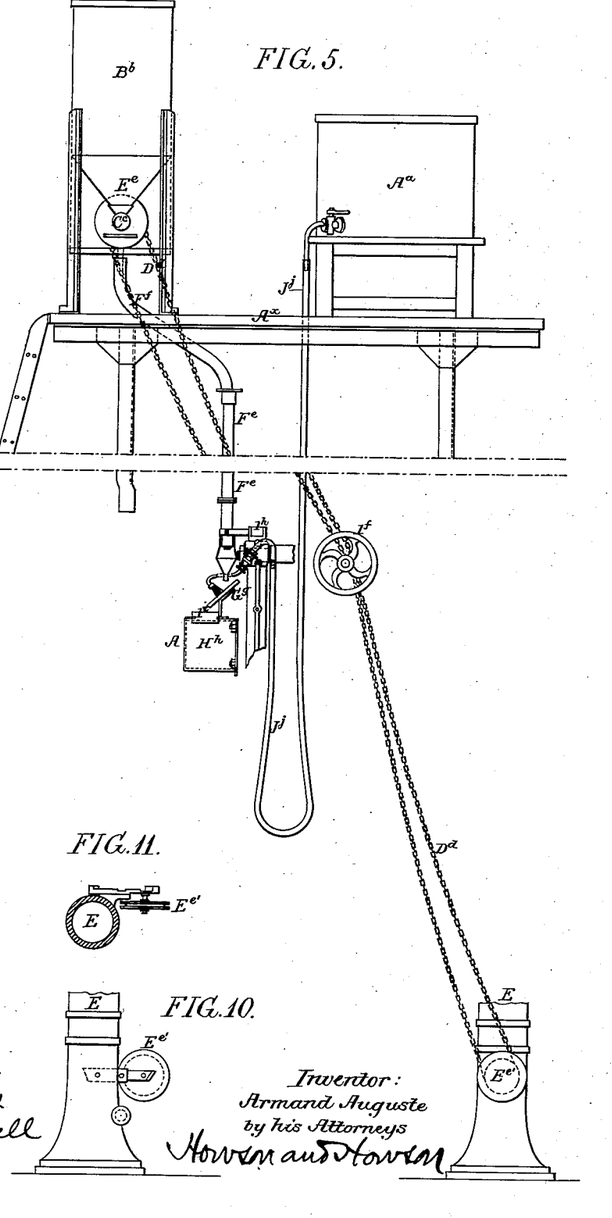
Figs. 5 to 11 are details of the sand-distributing devices.

Near the center of the railway X', and fixed to the bed-plate of the machine, there are two strong screws, $2^B$, Fig. 4, working in supports $2^A$, fixed parallel with the rails. Each screw carries a species of sleeve, $2^c$, connected with a nut which can travel from end to end of the screw, and each of these sleeves is provided at both extremities with two vertical holes or sockets, $2^D$. These holes are destined to receive the hooks of movable couplings $2^E$, placed on the frame Y' of the trolleys at front and back in the direction in which they travel on the railway. When the trolleys are coupled or connected to the sleeves $2^c$, the screws $2^B$ are turned by means of hand-wheels $2^f$, so as to move the trolleys forward or backward to the extent required in order to present the blocks in a proper position to the action of the endless cutting band or saw according to the lines marked out on the surfaces.

Figure 1:
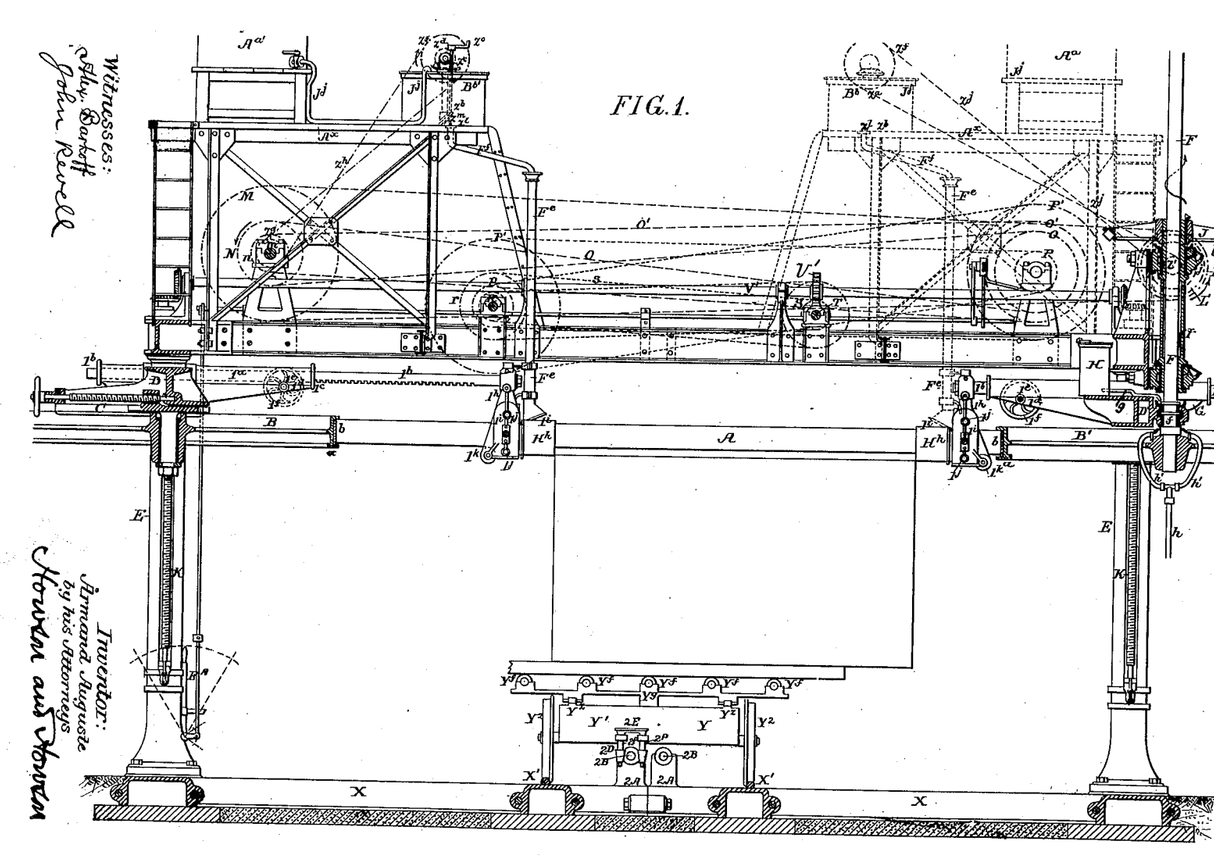
Figure 1 of the accompanying drawings represents a longitudinal vertical section of an improved band-saw machine constructed according to this invention.
Figure 2:
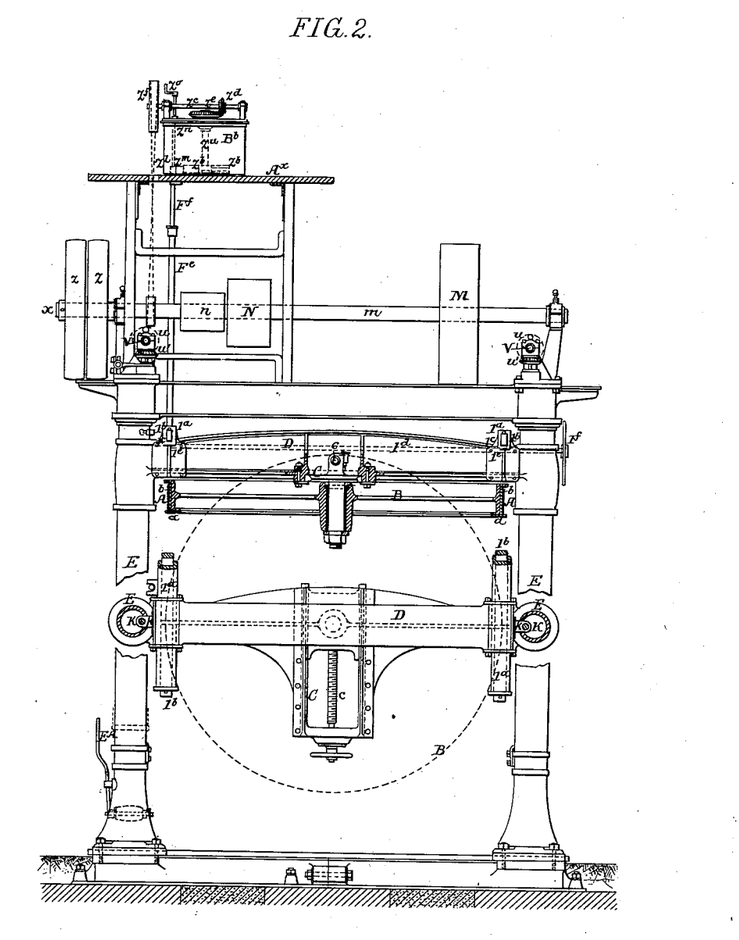
Figs. 2 and 3 represent the machine, partly in transverse section and partly in plan.
Figure 3:
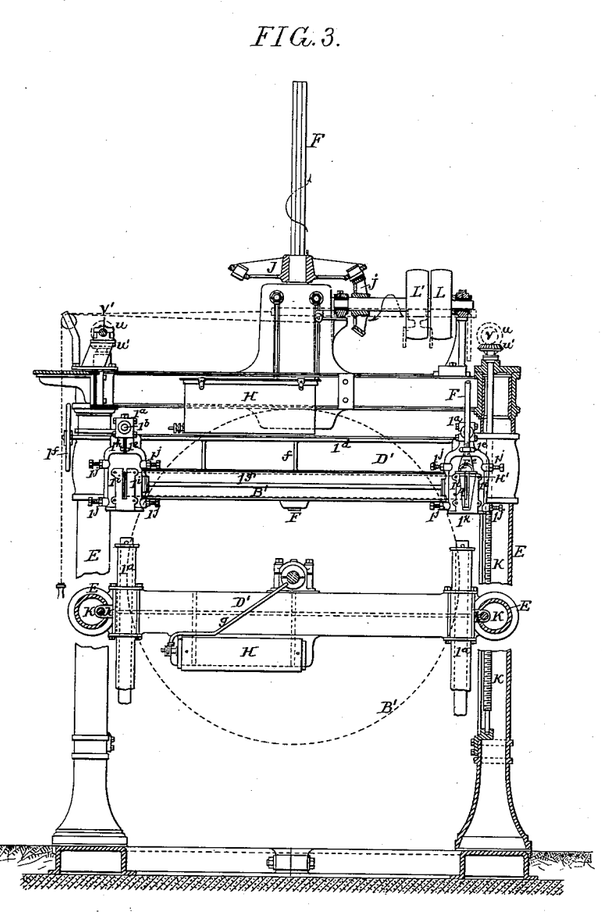

The water-cisterns $A^a$ and $A^{a\prime}$ and apparatus for mixing the grit and water (illustrated partly in full lines and partly in dotted lines in Figs. 1 and 2) are carried on elevated platforms $A^x$ of iron, forming a second horizontal frame bolted to the main horizontal frame of the machine at each end, being arranged directly over the places where the cutting-band enters the blocks of building-stone, marble, or granite. To these platforms are fixed (1) water-cisterns $A^a$ and $A^{a\prime}$ and (2) mixing apparatus $B^b$ and $B^{b\prime}$, Figs. 1 and 2, containing pulverized grit. Pipes $J^{j\prime}$, attached to the lower part of each water-tank $A^a$ and $A^{a\prime}$, conduct water to the mixing apparatus $B^b$ and $B^{b\prime}$. Vertical shafts $z^a$, (shown in dotted lines in the tank $B^{b\prime}$,) provided with blades or arms $z^b$, working in the center of these apparatus, are driven by bevel-wheels $Z^c$ and $Z^d$, Fig. 2, the first wheel being attached to the upper extremity of the shaft $Z^a$, the second being fixed on a short horizontal shaft, $Z^e$. Each horizontal shaft $Z^c$ is provided with a pulley, $Z^f$. One of these pulleys is driven by a small pulley, $Z^g$, carried by the main driving-shaft $m$, Figs. 1, 2, and 3, which transmits motion to the mixing apparatus in the vessel $B^{b\prime}$ by means of a belt, $Z^n$, and the other pulley, $Z^f$, of the mixer $B^b$ is driven by a belt, $Z^j$, on a small pulley, $Z^{i\prime}$, fixed on the shaft $l$. The object of these mixers with arms or blades is to stir the water in the tank $B^b$ $B^{b\prime}$ and maintain the grit or sand required for cutting extremely-hard materials constantly in suspension therein.

Openings $Z^l$ are provided in the lower part of each tank for the passage of the mixture, the delivery of which is controlled and regulated by a conical stopper or valve, $Z^m$, on a screw, $Z^n$, worked by a small crank-handle, $Z^o$. A rubber tube, $F^r$, fixed underneath the opening $Z^l$, extends to and enters loosely a metal pipe, $F^e$, Fig. 1, communicating with the cutter-guide $I^n$, to which it is attached so as to move therewith. The water and grit held in suspension in the mixers $B^{b\prime}$ and $B^b$ are thus conducted to cups or troughs $H^n$, inclosing the saw, being delivered in two separate streams by forked distributer I'. The sand and water accumulating in the lower part of the trough $H^n$ is taken up by the lower edge of the cutting band or saw A and worked into the cut.

Figs. 5 to 11 illustrate a modified arrangement of apparatus for supplying the cutter with grit and water, there being two such apparatus on each machine, one at each end. On platforms $A^x$, similarly constructed to those hereinbefore described and carried by the same iron frame-work bolted to each end of the main horizontal frame of the machine, there are fixed water-cisterns $A^a$, Fig. 5, and sand or grit boxes $B^b$, with conical or hopper bottoms filled with thoroughly-dry pulverized grit. A regulating-valve, $C^c$, (illustrated in vertical section in Figs. 6 and 7 and in horizontal section in Fig. 8,) is placed at the lower extremity of the hopper or inverted cone forming the bottom of the box $B^b$, for the purpose of regulating or stopping the delivery of dry-powdered grit. This valve is worked by a long chain, $D^d$, Fig. 5, which, first passing over a grooved pulley or sprocket-wheel, $E^e$, (illustrated in section in Figs. 6 and 9,) on a screwed shaft, $E^x$, descends to another similar grooved pulley or sprocket-wheel, $E^{e\prime}$, arranged at the base of one of the supporting columns E, Figs. 5, 10, and 11, of the machine in such a manner as to be near the man in charge of the machine. The screw $E^x$ works in a stationary nut and opens or closes a sliding valve at the bottom of the hopper, as will be readily understood by referring to Fig. 6. Pipes $F^f$, Fig. 5, of india-rubber, attached to the conical base of the sand-box $B^b$, and placed directly underneath the aforesaid valve, lead to metal pipes $E^c$, directly connected to and moving with the cutter-guides $I^n$ and supply dry grit to obliquely-placed nozzles $G^g$. On the other hand, the rubber tubes $J^j$, connected to an orifice in the lower part of each water-cistern $A^a$, supplies water to one of the nozzles $G^g$, which is supplied at the same time with dry grit from the box $B^b$. The mixture of grit and water is thus made in the nozzle $G^g$, being afterward divided into two approximately-equal streams by falling on a divider or distributing-plate, $I^i$, and then passing to the bottom of the trough $H^h$, where it is taken up by the cutting-band, as in the arrangement hereinbefore described.

Where the machine is arranged to work a number of cutting-bands acting simultaneously in opposite directions, the arrangement next hereinafter described is employed.

Figure 12:
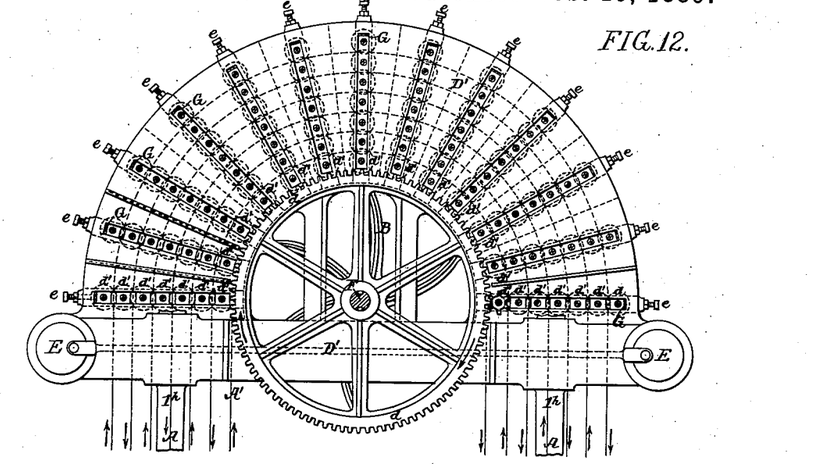
Figure 13:
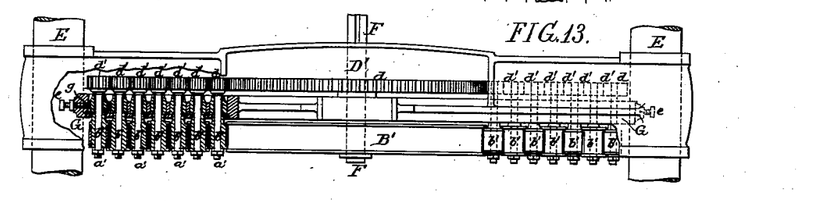
Figure 14:
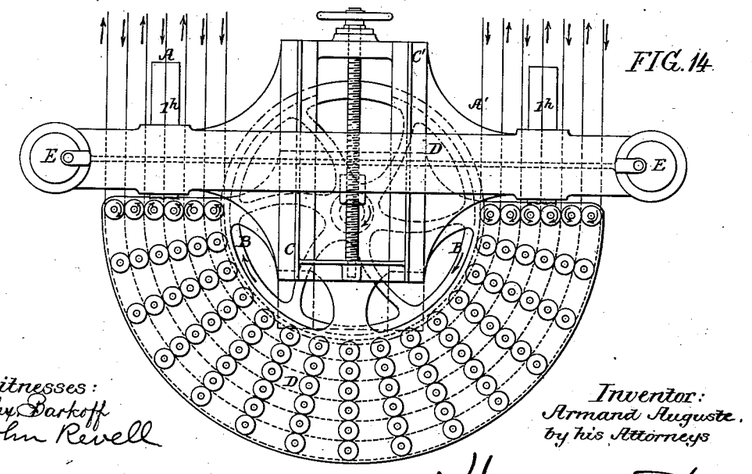

Figs. 12 and 13 represent, respectively, a plan and elevation, the latter partly in section, of the driving mechanism at one end of the machine; and Fig. 14 is a plan of the tension mechanism at the outer end.

Figures 6, 7, 8, 9, 15:
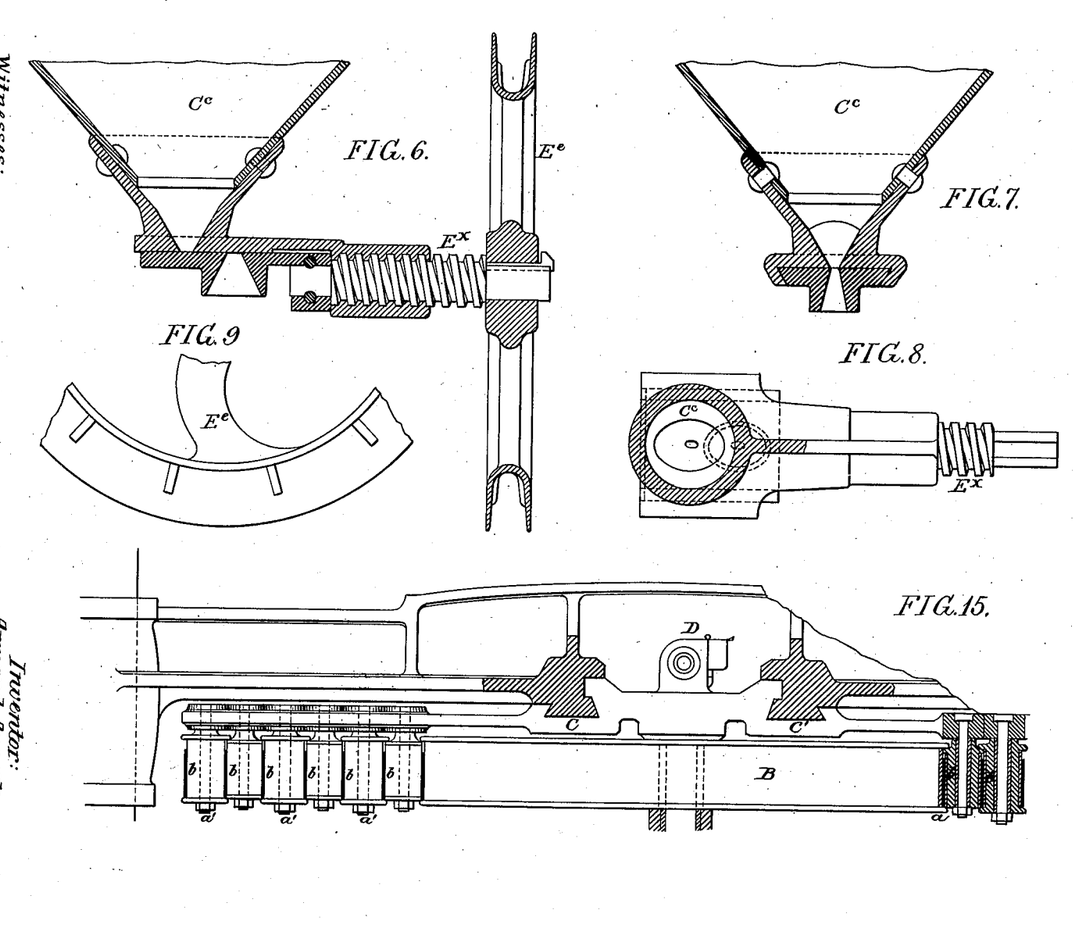
Figs. 12 to 15 illustrate in plan and in section parts of the machine adapted to work several band-saws or cutting-blades simultaneously.

Fig. 15 is an elevation, partly in section, of the said tension mechanism. The cutting-blades or band-saws are marked A A', and their number, which is regulated according to the number of cuts to be made in the marble, or granite, or other stone to be operated on, can be changed with facility. These endless bands or blades are arranged one within the other, and move in opposite directions alternately, as indicated by the arrows in Figs. 12 and 14. The inner blade, A', is carried by two drums, B B', as in the arrangement hereinbefore described; but the other blades are carried by a series of small rollers or pulleys, b b', Figs. 13 and 15, arranged in semicircles concentric to the drums. The drums and pulleys are so arranged as to admit of the ready removal of the bands A, and are carried by supports D D', capable of vertical movement on pillars or columns E, as hereinbefore described. The drum B and the corresponding small rollers, b, are loose on their axes, and are supported by a plate or frame, C C', adjustable horizontally on the support D by means of an adjusting-screw. By moving the frame C C' back and forth the tension of the cutter-bands will be adjusted. The drum B' and series of rollers b' impart motion to all the bands or cutters A A', the motion being transmitted by toothed or friction gearing. In the arrangement illustrated in Figs. 12 and 13 a toothed wheel, d, on the vertical shaft F, drives a series of pinions, d', fixed on the spindles of the small pulleys b'. The pinions on each radial line of pulleys are geared together, so as to cause the pulleys which are adjacent to each other to rotate in opposite directions. They propel the cutters in the directions indicated by the arrows.

The friction-gear, which is preferable on account of producing less jerks and noise, consists of a friction-wheel keyed on the grooved shaft F above the drum B' in the place of the toothed wheel d. (Shown in Figs. 12 and 13.) This friction-wheel transmits motion to small friction wheels or rollers, which are substituted for the pinions d', placed on the upper parts of the small vertical spindles or shafts which support the rollers b'. All these wheels are pressed together by screws e, working in tapped holes in the outer edge of the support D' and acting on gun-metal bearings G, sliding in radial slots g. These sliding bearings carry the short journals for the rollers b', and consequently the friction-wheel drives all the small friction-wheels simultaneously, the rotary motion being transmitted from one wheel to another, but in opposite directions alternately throughout the series, as in the case of the toothed gearing hereinbefore described. In either case the grooved driving-shaft F receives motion from a train of power-transmitting gear arranged, as hereinbefore described, with reference to a machine working with one cutting-band.

The circumferences of the drums B and B' and of the pulleys or rollers b b' are covered with a thick layer of india-rubber, and the drums are provided on their lower edges with removable flanges a, made in sections. The pulleys or rollers b b' are similarly provided with flanges a', which support the cutting-bands when slack. Cutter-guides are provided at $i^h$, Figs. 12 and 14, acting on the bands A, as hereinbefore described, the number of guide-rollers being suitably augmented. The cutters are supplied with grit and water by arrangements similar to those hereinbefore described, the number of inclined tubes being made to correspond with the number of cutters.

The machine can be attended to by one man stationed on the ground near one of the columns E, where there is provided a clutch-lever, $E^a$, Figs. 1 and 2, as well as suitable operating-cords for controlling the movement of the various gearing which drives the machine.

Having now particularly described the construction of my invention and the manner in which the same is to be used, I declare that what I claim is—

1. The combination, in a stone-sawing machine, of the foundation-plate, the vertical supports, the horizontal cutting-frame, and gearing for adjusting the cutting-frame vertically with the elevated platforms fixed upon the standards above the cutting-frame, the grit and water boxes on said platforms, and flexible distributing-tubes leading therefrom to the cutting mechanism.

2. The combination, in a stone-cutting machine, of the cutting-band and adjustable guides located at either side of the stone to be cut, with the longitudinally-moving rods carrying the guides and gearing for adjusting the rods at will.

3. The combination of a cutting-band, a drum around which the band passes, and an adjustable guide on each side of the drum with a shaft and operating-connections between the shaft and guides, whereby both guides are adjusted simultaneously.

4. In a stone-sawing machine, the combination of the drum B', which drives the cutting-blade, and the support therefor, provided with cup-bearing G, with a cistern, H, containing a suitable lubricant, and pipes conveying the lubricant to and away from the bearing, substantially as described.

5. In a stone-sawing machine, the combination of the cutting-band and the horizontal drums around which the band passes with separate flanges upon the drums projecting beyond the band and holding it in place, and fastening devices attaching the flanges to the drums, whereby the removal of the band is facilitated.

6. In a stone-cutting machine, the combination of the truck movable relatively to the cutting-blade and carrying the stone to be operated upon with the traveling nut and gear for moving said nut, and a suitable lock, one member of which is carried by the truck and the other by the nut, whereby the truck may be secured to the nut and be controlled in its movement thereby.

7. In a stone-sawing machine, the combination of the supports carrying the main driving-drum and a plurality of smaller rollers suitably journaled thereupon with a plurality of cutting bands or blades passing around and driven by the said drum and rollers, and power-transmitting gear between the drum and the rollers, substantially as described.

8. In a stone-sawing machine, the combination of a plurality of cutting bands or blades with a series of supporting-rollers arranged concentrically, around which the blades pass, and power-transmitting gear between the different rollers, whereby they are all driven by a single power-shaft, and adjacent blades moving in opposite directions, substantially as described.

In testimony whereof I have signed my name to this specification in the presence of two subscribing witnesses.

ARMAND AUGUSTE.

Witnesses:
LÉON FRANCKEN,
ROBT. M. HOOPER.